United States Patent
Koishi et al.

(10) Patent No.: US 10,784,697 B2
(45) Date of Patent: Sep. 22, 2020

(54) VEHICLE POWER SUPPLY CONTROL METHOD AND VEHICLE POWER SUPPLY CONTROL DEVICE

(71) Applicant: NISSAN MOTOR CO., LTD., Kanagawa (JP)

(72) Inventors: Akifumi Koishi, Kanagawa (JP); Masahiko Tahara, Kanagawa (JP); Atsushi Tezuka, Kanagawa (JP); Tomoyuki Koike, Kanagawa (JP); Munemitsu Watanabe, Kanagawa (JP); Terumasa Tsuchiya, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 405 days.

(21) Appl. No.: 15/762,443

(22) PCT Filed: Sep. 25, 2015

(86) PCT No.: PCT/JP2015/004891
§ 371 (c)(1),
(2) Date: Mar. 22, 2018

(87) PCT Pub. No.: WO2017/051444
PCT Pub. Date: Mar. 30, 2017

(65) Prior Publication Data
US 2018/0265021 A1 Sep. 20, 2018

(51) Int. Cl.
*H02J 7/00* (2006.01)
*H02J 7/14* (2006.01)
(Continued)

(52) U.S. Cl.
CPC ........... *H02J 7/0047* (2013.01); *B60L 58/12* (2019.02); *B60R 16/033* (2013.01);
(Continued)

(58) Field of Classification Search
CPC ......... H02J 7/0047; H02J 7/0068; H02J 7/14; H02J 7/34; H02J 7/0048; B60L 8/12; B60R 16/033
(Continued)

(56) References Cited

U.S. PATENT DOCUMENTS

| | | | | |
|---|---|---|---|---|
| 6,826,390 | B1* | 11/2004 | Tamura | H03F 3/45183 375/346 |
| 2015/0357820 | A1* | 12/2015 | Sugimoto | H02M 7/44 307/52 |
| 2018/0069274 | A1* | 3/2018 | Matsubara | H02J 7/0031 |

FOREIGN PATENT DOCUMENTS

| | | |
|---|---|---|
| JP | 2011-230618 A | 11/2011 |
| JP | 5494498 B2 | 5/2014 |

(Continued)

*Primary Examiner* — Paula L Schneider
(74) *Attorney, Agent, or Firm* — Osha Liang LLP (57) ABSTRACT

A vehicle power supply control method includes switching, when a constant voltage is required of a power supply circuit in generating electric power by a power generator, the power supply circuit being connected to a primary storage battery and configured to be connected to a secondary storage battery that has a lower internal resistance than that of the primary storage battery, between connection of the secondary storage battery to the power supply circuit and disconnection of the secondary storage battery from the power supply circuit depending on the required constant voltage, current output to the power supply circuit by the power generator, and a state of charge of the secondary storage battery.

6 Claims, 10 Drawing Sheets

(51) Int. Cl.
*H02J 7/34* (2006.01)
*B60L 58/12* (2019.01)
*B60R 16/033* (2006.01)

(52) U.S. Cl.
CPC .............. *H02J 7/0068* (2013.01); *H02J 7/14* (2013.01); *H02J 7/34* (2013.01); *H02J 7/0048* (2020.01)

(58) Field of Classification Search
USPC .......................................................... 701/22
See application file for complete search history.

(56) References Cited

FOREIGN PATENT DOCUMENTS

| JP | 2015-097463 A | 5/2015 |
| JP | 2015-150959 A | 8/2015 |
| JP | 2015-154618 A | 8/2015 |

\* cited by examiner

VEHICLE POWER SUPPLY CONTROL METHOD AND VEHICLE POWER SUPPLY CONTROL DEVICE

BACKGROUND

Technical Field

The present invention relates to a vehicle power supply control method and a vehicle power supply control device.

Related Art

The conventional technology described in PTL 1 proposes that a parallel connection of a high-performance storage battery and a lead storage battery can be formed and that the high-performance storage battery is connected when a constant voltage is required by an electric load in a state in which electricity is generated by a power generator.

CITATION LIST

Patent Literature

PTL 1: Japanese Patent No. 5494498

SUMMARY

Connection of a high-performance storage battery may make it impossible to supply a required constant voltage because of a decrease in the terminal voltage of the high-performance storage battery due to resulting in a decrease in apparent internal resistance even in the case of charging the high-performance storage battery with the same current.

One or more embodiments of the present invention stably supplies a required constant voltage.

According to one or more embodiments of the present invention, there is provided a vehicle power supply control method used when a constant voltage is required of a power supply circuit in generating electric power by a power generator, the power supply circuit being connected to a primary storage battery and configured to be connected to a secondary storage battery that has a lower internal resistance than that of the primary storage battery. Switching between connection of the secondary storage battery to the power supply circuit and disconnection of the secondary storage battery from the power supply circuit is performed depending on the required constant voltage, current output to the power supply circuit by the power generator, and a state of charge of the secondary storage battery.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Each drawing is schematic and may be different from the reality. The following embodiments are illustrative of devices and methods for embodying the technical idea of the present invention and are not intended to limit the configurations to the following ones. In other words, various modifications may be made to the technical idea of the present invention within the technical scope described in claims.

First, an overview of an idling stop system will be described.

Idling stop (IS) is the function of automatically stopping an engine when a vehicle is stopped, for example, at an intersection or in a traffic jam, and of restarting the engine when movement of the vehicle is started, and is also referred to as no idling or idle reduction.

Figure 1:
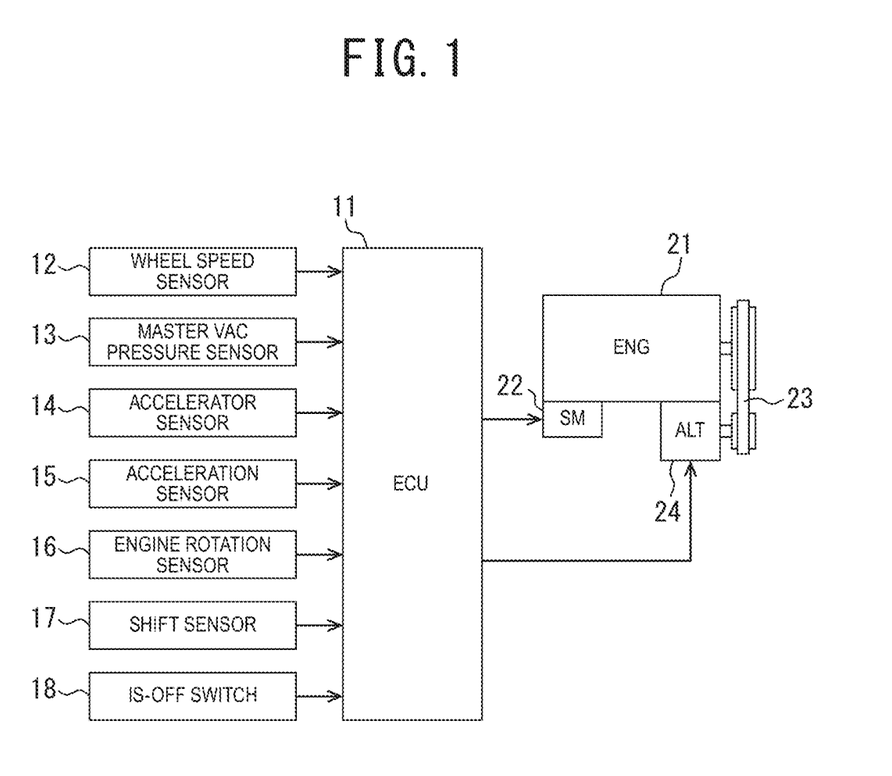
FIG. 1 is a configuration view of an idling stop system.

FIG. 1 is a configuration view of the idling stop system.

In the idling stop system, a controller (ECU: electronic control unit) 11 executes idling stop in response to detected values from various sensors. Examples of the various sensors include a wheel speed sensor 12, a master vac pressure sensor 13, an accelerator sensor 14, an acceleration sensor 15, an engine rotation sensor 16, a shift sensor 17, and an idling stop OFF switch 18.

The wheel speed sensor 12 detects the wheel speeds VwFL to VwRR of corresponding wheels. The wheel speed sensor 12 detects, for example, magnetic lines of force from a sensor rotor by a detection circuit, converts, into a current signal, a change in magnetic field caused by rotation of the sensor rotor, and outputs the current signal to the controller 11. The controller 11 determines the wheel speeds VwFL to VwRR from the input current signal.

The master vac pressure sensor 13 detects the pressure in a master vac (brake booster) as a brake pedal force Pb. The master vac pressure sensor 13 receives the pressure in the master vac by a diaphragm portion, detects a distortion generated in a piezoresistive element as a change in electrical resistance via the diaphragm portion, converts the change into a voltage signal proportional to the pressure, and outputs the voltage signal to the controller 11. The controller 11 determines the pressure in the master vac, i.e., the brake pedal force Pb from the input voltage signal.

The accelerator sensor 14 detects a pedal opening degree PPO (operation position) equivalent to the depressing amount of an accelerator pedal. The accelerator sensor 14, which is, for example, a potentiometer, converts the pedal opening degree PPO of the accelerator pedal into a voltage signal and outputs the voltage signal to the controller 11. The controller 11 determines the pedal opening degree PPO of the accelerator pedal from the input voltage signal. The pedal opening degree PPO is 0% when the accelerator pedal is at a non-operation position, while the pedal opening degree PPO is 100% when the accelerator pedal is at a maximum operation position (stroke end).

The acceleration sensor 15 detects the acceleration or deceleration rate in the forward-backward direction of a vehicle. The acceleration sensor 15 detects, for example, the position displacement of a movable electrode with respect to a fixed electrode as a change in electrostatic capacity, converts the change into a voltage signal proportional to the acceleration or deceleration rate and the direction, and outputs the voltage signal to the controller 11. The controller 11 determines the acceleration or deceleration rate from the input voltage signal. The controller 11 processes acceleration as a positive value and processes deceleration as a negative value.

The engine rotation sensor 16 detects an engine speed Ne. The engine rotation sensor 16 detects, for example, magnetic lines of force from a sensor rotor by a detection circuit, converts, into a current signal, a change in magnetic field caused by rotation of the sensor rotor, and outputs the current signal to the controller 11. The controller 11 determines the engine speed Ne from the input current signal.

The shift sensor 17 detects the shift position of a transmission. The shift sensor 17 includes, for example, plural Hall elements and outputs the corresponding ON/OFF signals of the Hall elements to the controller 11. The controller 11 determines the shift position from a combination of the input ON/OFF signals.

The idling stop OFF switch (IS-OFF switch) 18 detects an operation of cancelling the idling stop system. The idling stop OFF switch 18, which is disposed in the vicinity of a dash board so as to be able to be operated by a driver, outputs a voltage signal depending on the cancellation operation to the controller 11 via, for example, a detection circuit with a normally-closed contact. The controller 11 determines whether or not to cancel the idling stop function from the input voltage signal.

The controller 11 performs fuel injection control via a fuel injector and ignition timing control via an ignition coil to control stop and restart of an engine (ENG) 21. In addition, cranking performed by a starter motor (SM) 22 is controlled during the restart.

The starter motor 22, which includes, for example, a series commutator motor, cranks the engine 21 by engaging a ring gear of the engine 21 with a pinion gear of an output shaft to transmit torque to the ring gear. The starter motor 22 includes: a solenoid by which the pinion gear is axially slid to be advanced or retreated between a protrusion position at which the ring gear of the engine 21 is engaged with the pinion gear and a retraction position at which the ring gear of the engine 21 is not engaged with the pinion gear; a gear mechanism that slows down rotation of a rotation shaft; and the like.

The power of the engine 21 is transmitted to an alternator (ALT) 24 via a serpentine V-belt 23. The alternator 24 generates electric power with the power transmitted via the V-belt 23, and the generated electric power is supplied to a power supply circuit described later. The alternator 24 includes a regulator, and the voltage of the generated electric power is controlled via the regulator.

An overview of an operation of idling stop will now be described.

The idling stop system is in a stand-by state in which idling stop is permitted when, for example, all the following permission conditions are satisfied.

IS-OFF switch 88 is in non-operational state (idling stop function is in ON state).

State of charge (SOC) of battery is, for example, 70% or more.

Shift position is other than R range.

The engine 21 is stopped from the stand-by state described above when all the following operation conditions are satisfied and, for example, one second elapses.

Vehicle velocity V is 0 km/h.
Accelerator pedal opening degree PPO is 0%.
Brake pedal force Pb is, for example, 0.8 MPa or more.
Gradient of road surface is, for example, 14% or less.
Engine speed Ne is, for example, less than 1200 rpm.

In such a case, for example, the average value of wheel speeds VwFL to VwRR is used as the vehicle velocity V. The gradient of a road surface is calculated depending on an acceleration or deceleration rate. The gradient of a road surface is calculated as (vertical distance/horizontal distance)×100 and subjected to low-pass filter processing at, for example, 1 Hz.

The engine 21 is restarted from the stop state described above when any of the following restart conditions is satisfied.

Steering operation is started from time of idling stop.
Vehicle velocity V is, for example, 2 km/h or more.
Accelerator pedal opening degree PPO is, for example, 5% or more.
Operation of shifting from P range to R range or D range is performed.
Operation of shifting from N range to R range or D range is performed.
Operation of shifting from D range to R range is performed.

The above is the overview of the operation of the idling stop.

The controller 11 performs voltage variable control in which the voltage of electric power generated by the alternator 24 is controlled in a range of, for example, 11.4 to 15.6 V. In other words, the target voltage of generated electric power is calculated depending on the state of travel of a vehicle and the state of charge of a battery, and the voltage of electric power generated by the alternator 24 is controlled via the regulator depending on the calculated target voltage of generated electric power. A load on the engine 21 can be reduced to reduce a fuel consumption by allowing the voltage of electric power generated by the alternator 24 to be lower than usual, for example, when a vehicle is accelerated. When the voltage variable control is canceled, the alternator 24 performs usual power generation depending on the characteristics of the regulator.

The configuration of the power supply circuit will now be described.

Figure 2:
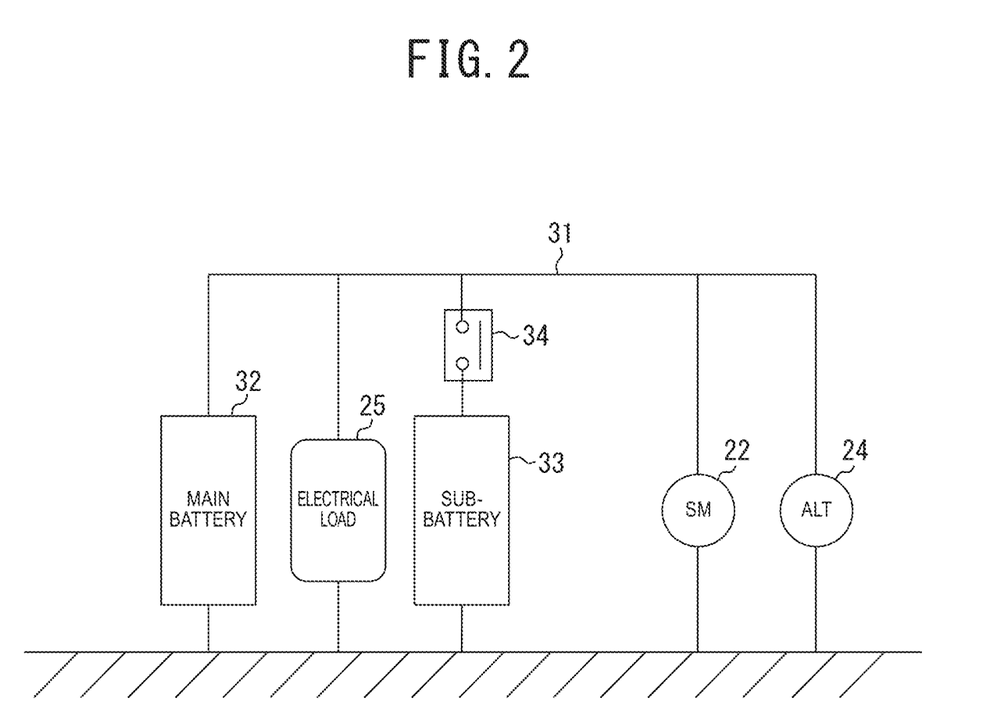
FIG. 2 is a configuration view of a power supply circuit.

FIG. 2 is a configuration view of the power supply circuit.

The power supply circuit 31, which is a circuit that supplies electric power to the starter motor 22 and another electrical load 25, includes a main battery 32, a sub-battery 33, and a relay 34. The power supply circuit 31 is adapted to also supply electric power to the controller 11.

For example, a lead storage battery is used as the main battery 32, in which lead dioxide is used as a positive electrode, spongy lead is used as a negative electrode, and dilute sulfuric acid is used as an electrolytic solution. The main battery 32 is charged with electric power generated by the alternator 24 and has an open-circuit voltage of, for example, 12.7 V in a full charge state.

The sub-battery 33 is disposed to prevent the power supply voltage of the vehicle is from momentarily dropping due to a large current passing through the starter motor 22 when the engine 21 is restarted from idling stop. For example, a lithium ion battery which is one kind of non-aqueous electrolyte secondary batteries is used in the sub-battery 33, in which a lithium metal oxide is used in a positive electrode, and a carbon material such as graphite is used in a negative electrode. The sub-battery 33 is charged with electric power generated by the alternator 24 and has an open-circuit voltage of, for example, 13.1 V in a full charge state.

A lithium ion battery has a feature of having a higher energy density and higher charge/discharge energy efficiency than a lead storage battery. Such a lithium ion battery does not involve dissolution-precipitation reaction of an electrode material when charged and discharged, and can therefore be expected to have a long life. In contrast, an electrode of such a lead storage battery is degraded by discharging the lead storage battery although the lead storage battery has a lower cost than a lithium ion battery at the same capacity. Therefore, the durability against repeated charge and discharge of such a lithium ion battery is superior to that of such a storage battery. In addition, such a lithium ion battery has a lower internal resistance than such a lead storage battery, and therefore has high charge/discharge performance.

The relay 34, which is a switch that switches between connection of the sub-battery 33 to the power supply circuit 31 and disconnection of the sub-battery 33 from the power supply circuit 31, is controlled by the controller 11. The relay 34, which is a normally open a-contact, disconnects the sub-battery 33 from the power supply circuit 31 when the contact is opened and connects the sub-battery 33 to the power supply circuit 31 when the contact is closed. Specifically, the sub-battery 33 is connected to the power supply circuit 31 and charged with electric power supplied from the alternator 24 while the engine 21 is in the state of being driven. When the engine 21 is restarted from idling stop, the sub-battery 33 is connected to the power supply circuit 31 to supply electric power to the starter motor 22. In addition, the sub-battery 33 is connected and disconnected to and from the power supply circuit 31, as needed.

Connection/disconnection control processing executed by the controller 11 will now be described.

Figure 3:
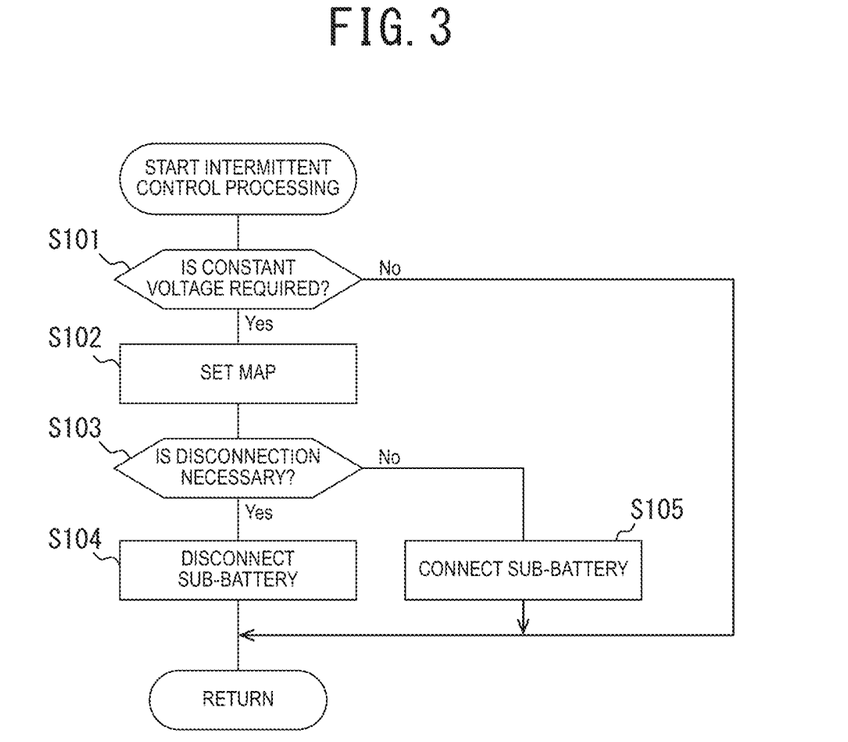
FIG. 3 is a flowchart illustrating connection/disconnection control processing.

FIG. 3 is a flowchart illustrating the connection/disconnection control processing.

First, in step S101, it is determined whether or not the electrical load 25 that requires a constant high voltage (hereinafter referred to as "constant voltage") of the power supply circuit 31 is present. Examples of the electrical load 25 that requires the constant voltage include a wiper and a high-pressure fuel pump. When the constant voltage is required, the processing goes to step S102. In contrast, when the constant voltage is not required, the processing returns to a predetermined main program on an as-is basis.

In step S102, a map for determining whether or not the sub-battery 33 should be disconnected from the power supply circuit 31 is set.

Figure 4:
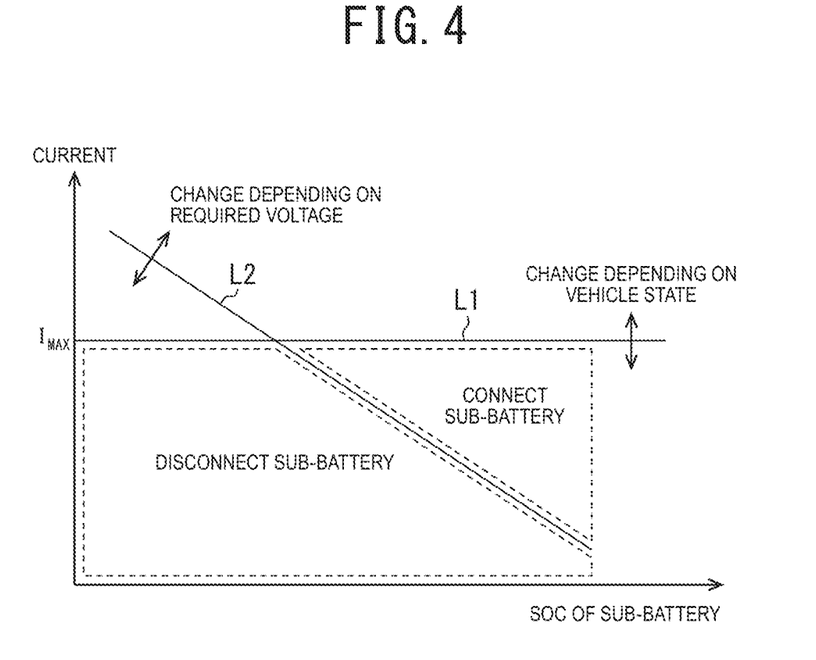
FIG. 4 is a map for determining whether or not to disconnect a sub-battery.

FIG. 4 is a map for determining whether or not to disconnect the sub-battery.

The abscissa axis is set to the state of charge (SOC) of the sub-battery 33 while the ordinate axis is set to current. First, a characteristic line L1 representing a maximum current $I_{MAX}$ which can be output by the alternator 24 is set. The characteristic line L1 is a straight line parallel to the abscissa axis and is determined depending on an engine speed, the usage of the electrical load 25, the state of the main battery 32, and the like. In addition, a characteristic line L2 representing a charging current depending on the state of charge in the case of applying a constant voltage is set. The characteristic line L2, which is a straight line representing a charging current decreasing with increasing the state of charge of the sub-battery 33, is determined depending on a required constant voltage.

Therefore, the required constant voltage can be achieved even in the case of connection of the sub-battery 33 when the charging current is equal to or less than the maximum current $I_{MAX}$ and higher than the characteristic line L2, and the state of charge of the sub-battery 33 is higher than the characteristic line L2. Thus, it is not necessary to disconnect the sub-battery 33 from the power supply circuit 31 in a region surrounded by the characteristic line L1, the characteristic line L2, and the abscissa axis, and therefore it is determined that the sub-battery 33 is to be connected to the power supply circuit 31. In contrast, it is impossible to achieve the required constant voltage in the case of connection of the sub-battery 33 when the state of the charge is equal to or less than the maximum current $I_{MAX}$ and lower than the characteristic line L2, and the state of the charge of the sub-battery 33 is higher than the characteristic line L2. Thus, it is determined that it is necessary to disconnect the sub-battery 33 from the power supply circuit 31 in a region surrounded by the abscissa axis, the ordinate axis, the characteristic line L1, and the characteristic line L2.

In subsequent step S103, it is determined whether or not it is necessary to disconnect the sub-battery 33 from the power supply circuit 31. When it is necessary to disconnect the sub-battery 33, the processing goes to step S104. In contrast, when it is not necessary to disconnect the sub-battery 33, the processing goes to step S105.

In step S104, the sub-battery 33 is disconnected from the power supply circuit 31 by opening the relay 34, and the processing returns to the predetermined main program.

In step S105, the sub-battery 33 is connected to the power supply circuit 31 by closing the relay 34, and the processing returns to the predetermined main program.

The above is the connection/disconnection control processing.

Some electrical loads 25 require a constant high voltage of the power supply circuit 31. In such a case, connection of the sub-battery 33 with a low internal resistance and high performance such as a lithium-ion battery may cause a decrease in apparent internal resistance, resulting in a decrease in the terminal voltage of the sub-battery 33 even in the case of charge with the same current. In this case, it may be impossible to supply a required constant voltage.

Figure 5:
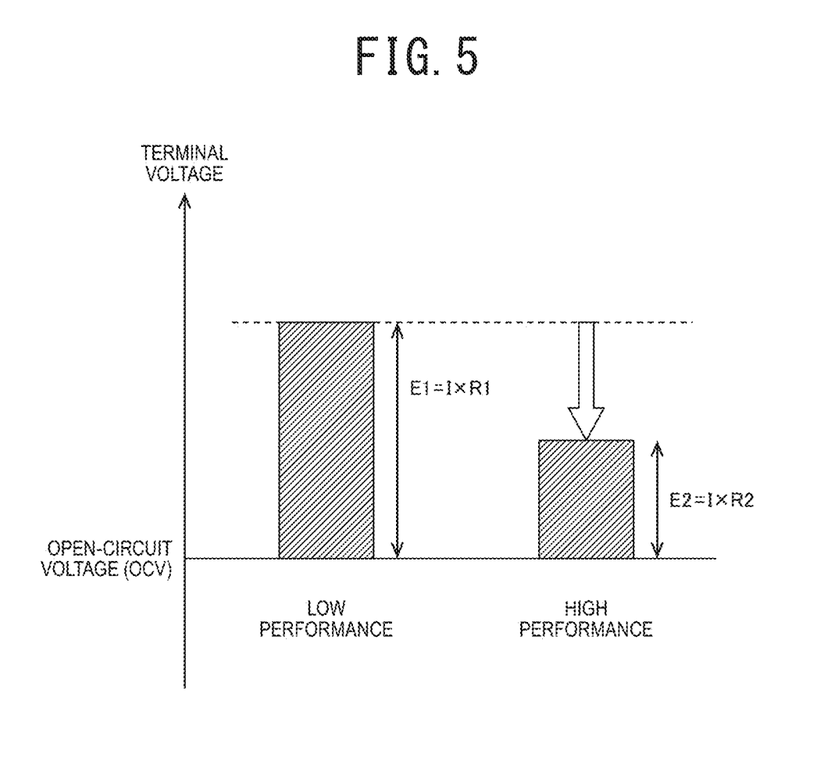
FIG. 5 is a view for explaining a decrease in terminal voltage.

FIG. 5 is a view for explaining a decrease in terminal voltage.

An internal resistance in the case of connection of a low-performance storage battery is assumed to be R1, and an internal resistance in the case of connection of a high-performance storage battery is assumed to be R2. A relationship of R1>R2 is satisfied because the high-performance storage battery has a lower internal resistance and higher charge acceptance performance than the low-performance storage battery. In addition, when a charging current is assumed to be I, the terminal voltage of the low-performance storage battery is a value obtained by adding E1=I×R1 to an open-circuit voltage while the terminal voltage of the high-performance storage battery is a value obtained by adding E2=I×R2 to the open-circuit voltage. Therefore, the connection of the high-performance storage battery results in a lower terminal voltage than the connection of the low-performance storage battery.

Even when the voltage of electric power generated by the alternator 24 is increased in a case in which a constant high voltage is required, the generated electric power is easily absorbed in the high-performance storage battery, and it may be impossible to supply a constant voltage depending on the state of charge of the high-performance storage battery. In addition, the alternator 24 has a limitation in current that can be output. Therefore, when the maximum current $I_{MAX}$ that can be output by the alternator 24 is reached before a constant voltage is achieved, it is impossible to further increase a voltage. For example, when the capacity of the alternator 24 is 150 [A], a current of 50 [A] is supplied for consumption in the electrical load, and a current of 40 [A] is supplied for charging the main battery 32, only a current of 60 [A] can be supplied for charging the sub-battery 33. As a result, a case occurs in which, for example, a voltage can be increased only to 13.6 [V] although a voltage of 14 [V] is required as a constant voltage.

Thus, how much electric current passes, how much current can be output by the alternator 24, and how much electric power is absorbed by the sub-battery 33 when a constant voltage is applied are taken into consideration when the constant voltage is required ("YES" in determination in step S101). In other words, a map for switching between connection and disconnection of the sub-battery 33 is set in consideration of the required constant voltage, the maximum current $I_{MAX}$ of the alternator 24, and the state of charge of the sub-battery 33 (step S102).

With reference to the map, it is determined that the constant voltage can be achieved even by the connection of the sub-battery 33 when the charging current is equal to or less than the maximum current $I_{MAX}$ and higher than the characteristic line L2, and the state of charge of the sub-battery 33 is higher than the characteristic line L2 ("NO" in determination in step S103). In other words, the sufficiently high state of charge of the sub-battery 33 results in the high terminal voltage of the sub-battery and in a small difference between the terminal voltage and the required constant voltage. Therefore, the voltage can be increased to the constant voltage within the range of the extra capacity of the alternator 24, and therefore the sub-battery 33 is allowed to be in the state of being connected to the power supply circuit 31 (step S105).

In contrast, it is determined that it is impossible to achieve the constant voltage by the connection of the sub-battery 33 when the state of charge is equal to or less than the maximum current $I_{MAX}$ and lower than the characteristic line L2, and the state of charge of the sub-battery 33 is higher than the characteristic line L2 ("YES" in determination in step S103). In other words, the low state of charge of the sub-battery 33 also results in the low terminal voltage of the sub-battery and causes a large difference between the terminal voltage and the required constant voltage. Therefore, the maximum current $I_{MAX}$ is reached before the voltage is increased to the constant voltage by the alternator 24, and therefore the sub-battery 33 is disconnected from the power supply circuit 31 (step S104). As a result, charge acceptance performance is deteriorated in the power supply circuit 31; however, since apparent internal resistance is increased, a reduction in the voltage of the power supply circuit 31 can be avoided to achieve the required constant voltage.

The above-described connection/disconnection control is performed without distinguishing between regeneration (charge) and non-regeneration (non-charge) because it is demanded that the state of charge of the sub-battery 33 is always allowed to be within a certain range when the sub-battery 33 is connected to the power supply circuit 31 in a state in which a constant voltage is required.

The required constant voltage can be stably supplied because switching between connection and disconnection of the sub-battery 33 is performed in consideration of a required constant voltage, the maximum current $I_{MAX}$ of the alternator 24, and the state of charge of the sub-battery 33, as described above.

Figure 6:
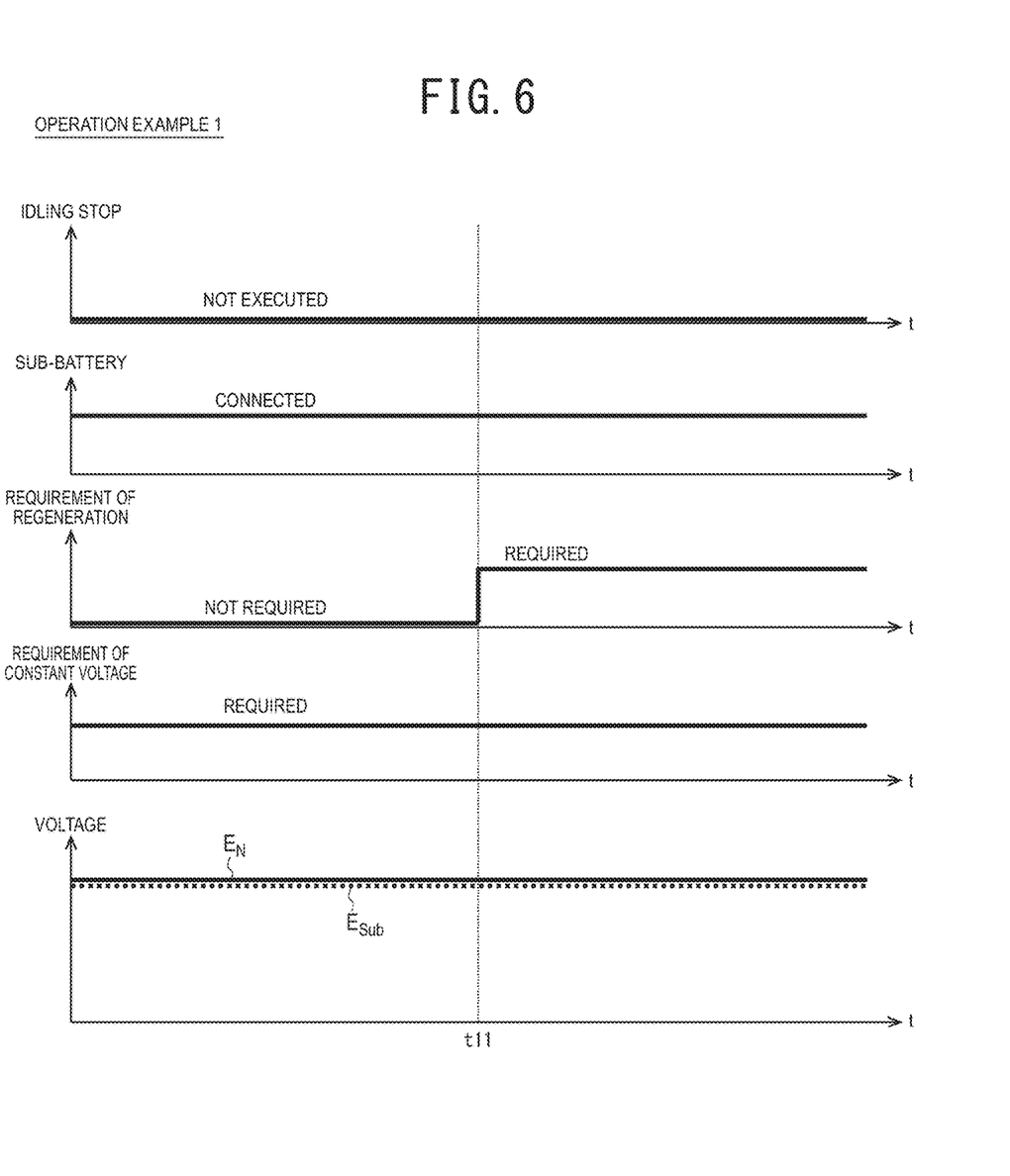
FIG. 6 is a time chart illustrating Operation Example 1.

FIG. 6 is a time chart illustrating Operation Example 1.

In such a case, the state of operation of idling stop, the connection/disconnection state of the sub-battery 33, whether or not to require regeneration, whether or not to require a constant voltage, and a voltage are represented along a time axis. For the voltage, a required constant voltage $E_N$ is indicated by a continuous line while the voltage $E_{sub}$ of the sub-battery 33 is indicated by a dotted line.

The voltage $E_{sub}$ achieves the constant voltage $E_N$ because state of charge of the sub-battery 33 is sufficient although the constant voltage is required. Therefore, it is not necessary to disconnect the sub-battery 33, and the sub-battery 33 remains connected to the power supply circuit 31. It is determined whether or not to disconnect the sub-battery 33 regardless of whether or not to require regeneration although regeneration is required at a time point t11. In such a case, idling stop is assumed to be unoperated.

Figure 7:
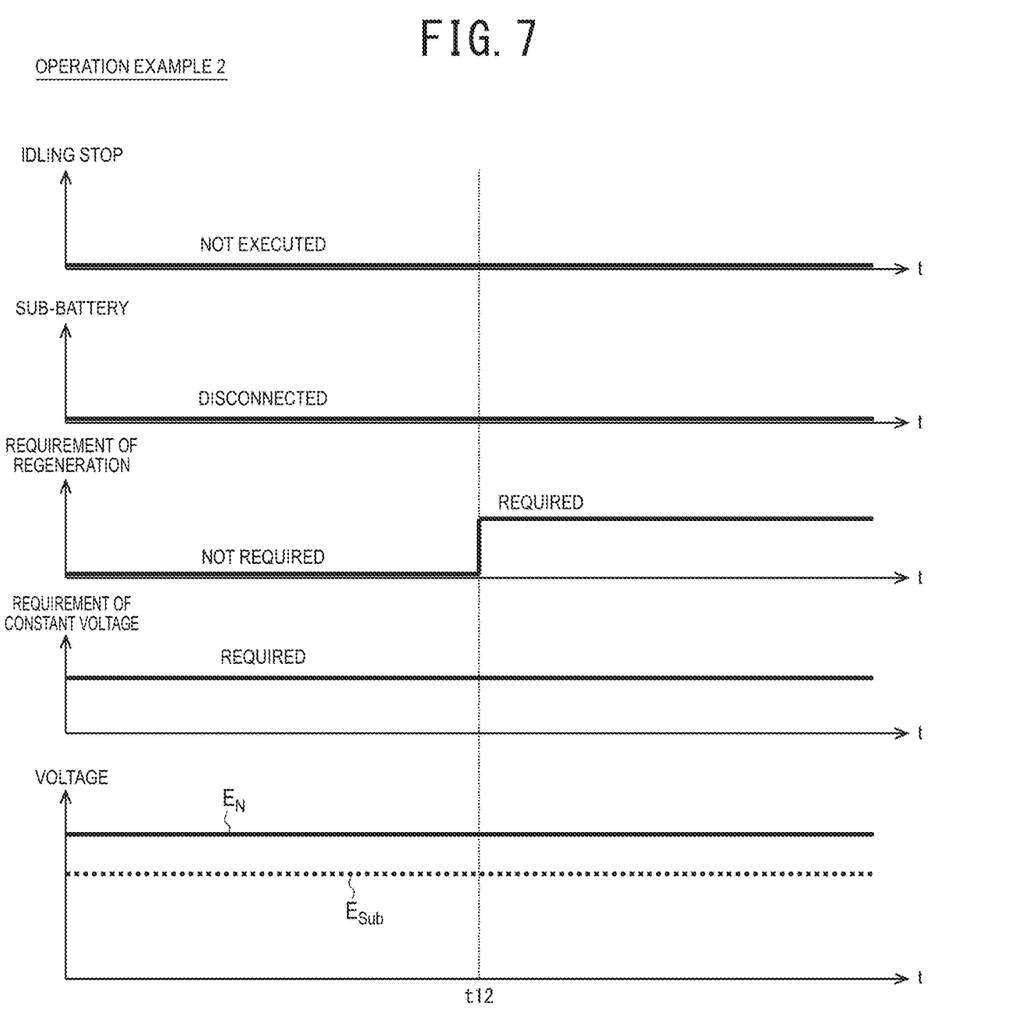
FIG. 7 is a time chart illustrating Operation Example 2.

FIG. 7 is a time chart illustrating Operation Example 2.

In such a case, the state of operation of idling stop, the connection/disconnection state of the sub-battery 33, whether or not to require regeneration, whether or not to require a constant voltage, and a voltage are represented along a time axis. For the voltage, a required constant voltage $E_N$ is indicated by a continuous line while the voltage $E_{sub}$ of the sub-battery 33 is indicated by a dotted line.

The voltage $E_{sub}$ is lower than the constant voltage $E_N$ because the state of charge of the sub-battery 33 is insufficient although the constant voltage is required. In such a case, it is impossible to increase the voltage to the constant voltage by the alternator 24, and therefore the sub-battery 33 remains disconnected from the power supply circuit 31. As a result, the constant voltage $E_N$ is achieved due to the voltage $E_{Main}$ (of which an illustration is omitted) of the main battery 32. It is determined whether or not to disconnect the sub-battery 33 regardless of whether or not to require regeneration although regeneration is required at a time point t12. In such a case, idling stop is assumed to be unoperated.

Figure 8:
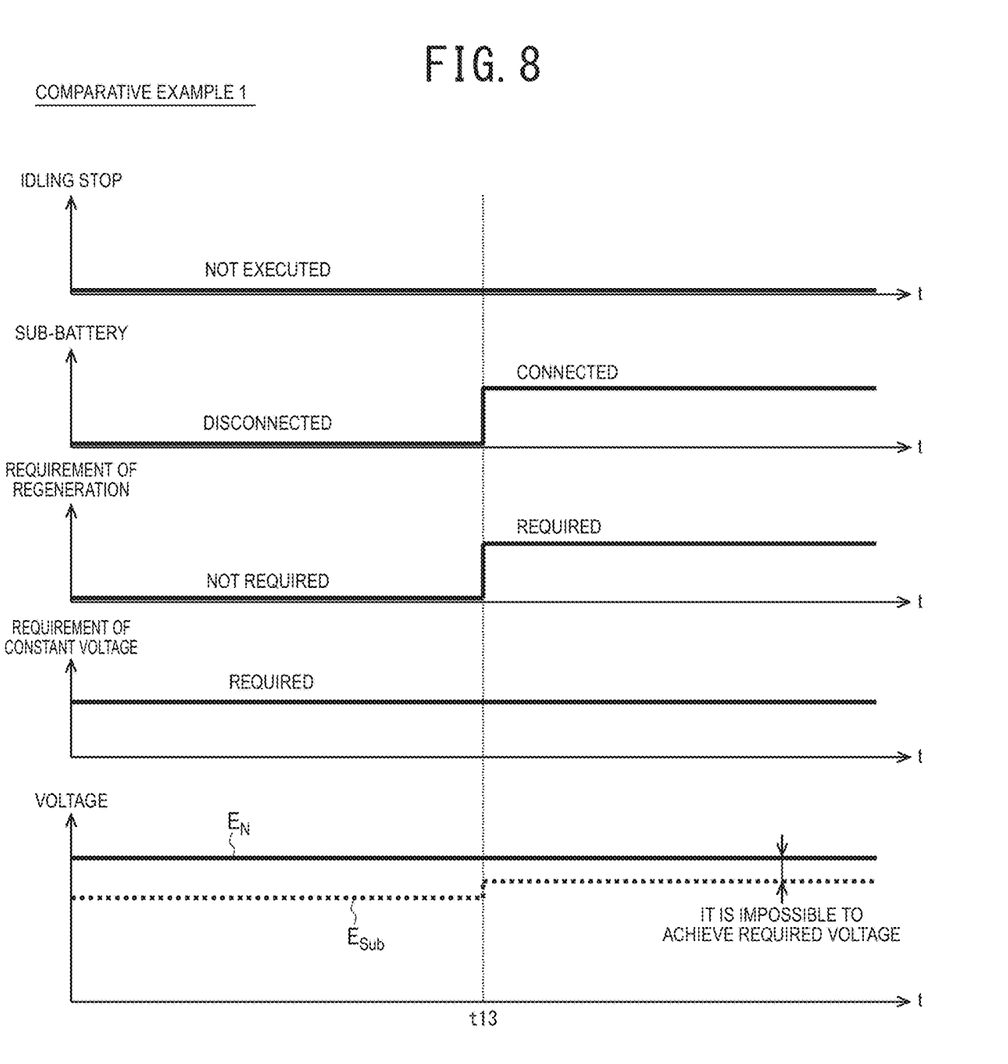
FIG. 8 is a time chart illustrating Comparative Example 1.

FIG. 8 is a time chart illustrating Comparative Example 1.

In such a case, the state of operation of idling stop, the connection/disconnection state of the sub-battery 33, whether or not to require regeneration, whether or not to require a constant voltage, and a voltage are represented along a time axis. For the voltage, a required constant voltage $E_N$ is indicated by a continuous line while the voltage $E_{sub}$ of the sub-battery 33 is indicated by a dotted line.

The state of charge of the sub-battery 33 is insufficient although the constant voltage is required. In such a case, regeneration is required at a time point t13, and even the connection of the sub-battery 33 is incapable of increasing the voltage $E_{sub}$ to the constant voltage $E_N$ due to a limitation in the output performance of the alternator 24. In such a case, idling stop is assumed to be unoperated.

《Application Example》

It is desirable to connect the sub-battery 33 to the power supply circuit 31 in order to suppress discharge of the main battery 32 while the engine 21 is stopped by idling stop.

Figure 9:
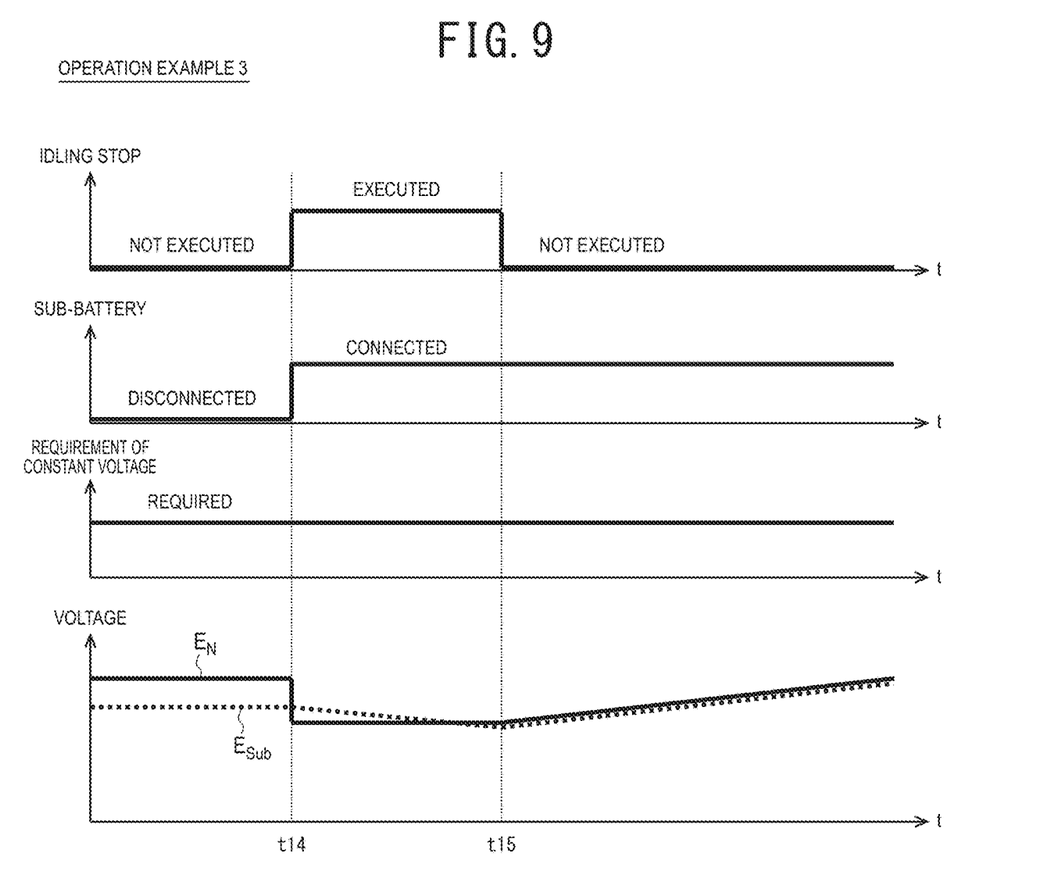
FIG. 9 is a time chart illustrating Operation Example 3.

FIG. 9 is a time chart illustrating Operation Example 3.

In such a case, the state of operation of idling stop, the connection/disconnection state of the sub-battery 33, whether or not to require a constant voltage, and a voltage are represented along a time axis. For the voltage, a required constant voltage $E_N$ is indicated by a continuous line while the voltage $E_{Sub}$ of the sub-battery 33 is indicated by a dotted line.

The engine 21 is stopped by idling stop at a time point t14. In such a case, discharge of the main battery 32 can be suppressed by connecting the sub-battery 33 to the power supply circuit 31. The required constant voltage $E_N$ is also decreased due to the stopping of the engine 21. When the engine 21 is stopped, the alternator 24 is also stopped, it is impossible to increase the voltage, and therefore the voltage is lower than during travel if no DC/DC converter is mounted.

At a time point t15, the engine 21 is restarted, and therefore the required constant voltage $E_N$ also increases. A case is illustrated in which the required constant voltage $E_N$ gradually increases. For example, in a wiper, a needed output increases with increasing a vehicle velocity, and therefore a high voltage is not immediately required. In such a case, it is unnecessary to immediately disconnect the sub-battery 33, and it is acceptable to gradually increase the voltage while allowing the sub-battery 33 to remain connected to the power supply circuit 31. If the sub-battery 33 is connected by operation of idling stop as described above, driving of the relay 34 can be suppressed not by immediately disconnecting the sub-battery but by maintaining such a state, if possible. In other words, minimization of the opening and closing operation of the relay 34 results in an advantage in durability.

Figure 10:
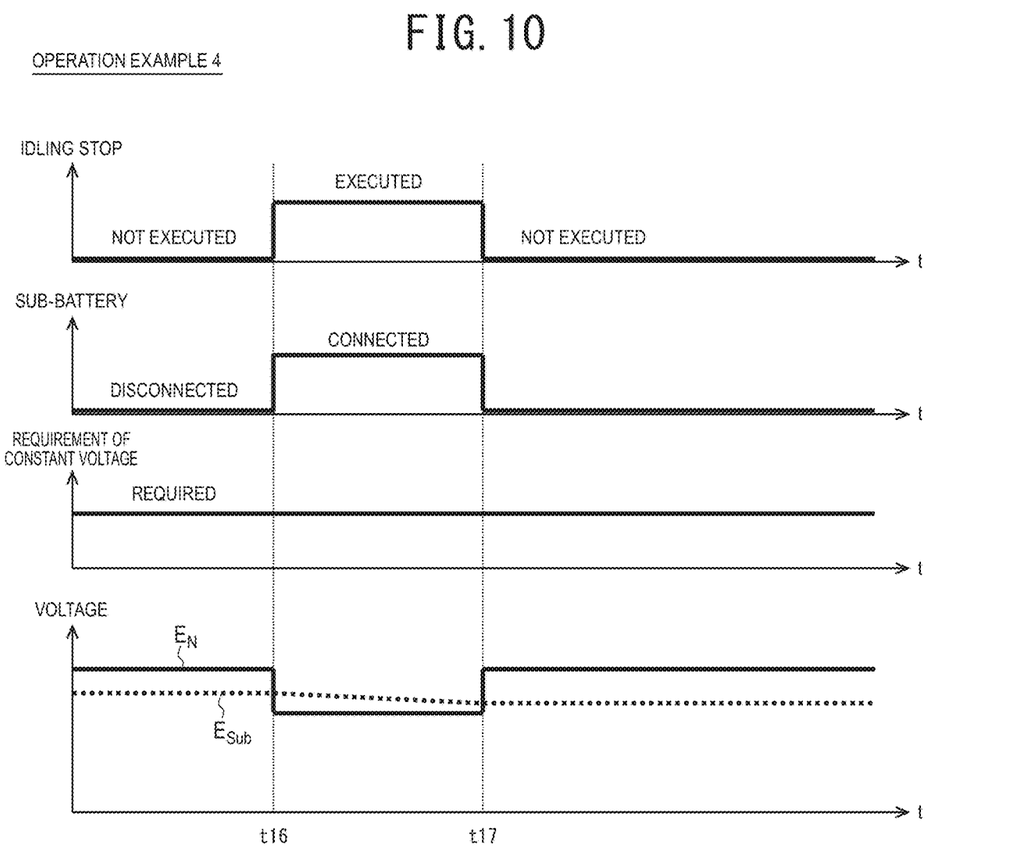
FIG. 10 is a time chart illustrating Operation Example 4.

FIG. 10 is a time chart illustrating Operation Example 4.

In such a case, the state of operation of idling stop, the connection/disconnection state of the sub-battery 33, whether or not to require a constant voltage, and a voltage are represented along a time axis. For the voltage, a required constant voltage $E_N$ is indicated by a continuous line while the voltage $E_{Sub}$ of the sub-battery 33 is indicated by a dotted line.

The engine 21 is stopped by idling stop at a time point t16, and the engine 21 is restarted at a time point t17. A case is illustrated in which the required constant voltage $E_N$ immediately increases. For example, a high-pressure fuel pump may immediately require a high voltage. In such a case, priority is given to stable supply of the constant voltage by immediate disconnection of the sub-battery 33.

«Alternative Example»

One or more of the above embodiments has been described in terms of, but is not limited to, the case in which the relay 34 is a mechanical switch. For example, an MOSFET (metal-oxide-semiconductor field-effect transistor) may be used. In this case, a similar action effect can be obtained by performing switching control of the MOSFET to form a state in which a circuit voltage is high and the charging current of the sub-battery 33 is low.

«Correspondence Relationship»

The main battery 32 corresponds to "primary storage battery." The sub-battery 33 corresponds to "secondary storage battery." The relay 34 corresponds to "switch for secondary storage battery." The alternator 24 corresponds to "power generator." The processings in steps S101 to S105 correspond to "connection/disconnection control unit."

The effects of the principal units in one or more embodiments of the present invention will now be described.

(1) In a vehicle power supply control method according to one or more embodiments of the present invention, when a constant voltage is required of the power supply circuit 31 to which the main battery 32 is connected and the sub-battery 33 configured to have a lower internal resistance than the main battery 32 can be connected, switching between connection of the sub-battery 33 to the power supply circuit 31 and disconnection of the sub-battery 33 from the power supply circuit 31 is performed depending on the required constant voltage, maximum current able to be output to the power supply circuit 31 by the alternator 24, and the state of charge of the sub-battery 33.

The required constant voltage can be stably supplied because the switching between the connection and disconnection of the sub-battery 33 is performed in consideration of the required constant voltage, the maximum current of the alternator, and the state of charge of the sub-battery 33, as described above.

(2) In the vehicle power supply control method according to one or more embodiments of the present invention, when an engine stop function of stopping the engine 21 depending on the state of a vehicle is included, the sub-battery 33 is connected to the power supply circuit 31 while the engine 21 is stopped by the engine stop function.

Discharge of the main battery 32 can be suppressed by connecting the sub-battery 33 to the power supply circuit 31 while the engine 21 is stopped, as described above.

(3) In the vehicle power supply control method according to one or more embodiments of the present invention, a state in which the sub-battery 33 is connected to the power supply circuit 31 is maintained in a case in which the constant voltage is not immediately required when the engine 21 is restarted.

Opening and closing operation of the relay 34 can be reduced to enhance durability because the sub-battery 33 remains connected to the power supply circuit 31 when the constant voltage is not immediately required, as described above.

(4) In the vehicle power supply control method according to one or more embodiments of the present invention, the sub-battery 33 is disconnected from the power supply circuit 31 in a case in which the constant voltage is immediately required when the engine 21 is restarted.

The required constant voltage can be stably supplied because the sub-battery 33 is disconnected from the power supply circuit 31 when the constant voltage is immediately required as described above.

(5) In the vehicle power supply control method according to one or more embodiments of the present invention, the relay 34 switches between connection of the sub-battery 33 to the power supply circuit 31 and disconnection of the sub-battery 33 from the power supply circuit 31.

The switching between the connection and disconnection of the sub-battery 33 can be easily and reliably performed by using the relay 34 as described above.

(6) A vehicle power supply control device according to one or more embodiments of the present invention includes: the main battery 32 configured to be connected to the power supply circuit 31; the sub-battery 33 configured to have a lower internal resistance than the main battery 32 and to be able to be connected to the power supply circuit 31; and the alternator 24 configured to supply generated electric power to the power supply circuit 31. When a constant voltage is required of the power supply circuit 31, switching between connection of the sub-battery 33 to the power supply circuit 31 and disconnection of the sub-battery 33 from the power supply circuit 31 is performed depending on the required constant voltage, maximum current able to be output by the alternator 24, and the state of charge of the sub-battery 33.

The required constant voltage can be stably supplied because the switching between the connection and disconnection of the sub-battery 33 is performed in consideration of the required constant voltage, the maximum current of the alternator, and the state of charge of the sub-battery 33, as described above.

A description has been provided above with reference to a limited number of embodiments. However, the scope of right is not limited thereto, and modifications of the embodiments based on the disclosure described above are apparent to those skilled in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

11 Controller
21 Engine
22 Starter motor
24 Alternator
25 Electrical load
31 Power supply circuit
32 Main battery
33 Sub-battery
34 Relay

The invention claimed is:

1. A vehicle power supply control method, comprising: switching, when a constant voltage is required of a power supply circuit in generating electric power by a power generator, the power supply circuit being connected to a primary storage battery and configured to be connected to a secondary storage battery that has a lower internal resistance than that of the primary storage battery, between connection of the secondary storage battery to the power supply circuit and disconnection of the secondary storage battery from the power supply circuit depending on the required constant voltage, current output to the power supply circuit by the power generator, and a state of charge of the secondary storage battery.

2. The vehicle power supply control method according to claim 1, wherein, when an engine stop function of stopping an engine depending on a state of a vehicle is included, the secondary storage battery is connected to the power supply circuit while the engine is stopped by the engine stop function.

3. The vehicle power supply control method according to claim 2, wherein a state in which the secondary storage battery is connected to the power supply circuit is maintained in a case in which the constant voltage is not immediately required when the engine is restarted.

4. The vehicle power supply control method according to claim 2, wherein the secondary storage battery is disconnected from the power supply circuit in a case in which the constant voltage is immediately required when the engine is restarted.

5. The vehicle power supply control method according to claim 1, wherein a switch for the secondary storage battery switches between connection of the secondary storage battery to the power supply circuit and disconnection of the secondary storage battery from the power supply circuit.

6. A vehicle power supply control device including:
a primary storage battery configured to be connected to a power supply circuit;
a secondary storage battery configured to have a lower internal resistance than that of the primary storage battery, and configured to be connected to the power supply circuit;
a power generator configured to supply generated electric power to the power supply circuit; and
a connection/disconnection controller configured to switch, when a constant voltage is required of the power supply circuit in generating electric power by the power generator, between connection of the secondary storage battery to the power supply circuit and disconnection of the secondary storage battery from the power supply circuit depending on the required constant voltage, current output by the power generator, and a state of charge of the secondary storage battery.

* * * * *